UNITED STATES PATENT OFFICE.

FRANÇOIS COIGNET, OF PARIS, FRANCE.

IMPROVEMENT IN MAKING ARTIFICIAL STONE AND CONCRETE.

Specification forming part of Letters Patent No. 98,034, dated December 21, 1869.

*To all whom it may concern:*

Be it known that I, FRANÇOIS COIGNET, of the city of Paris, in the department of la Seine, France, have invented an Improved Mode of Employing Agglomerated Béton, (concrete,) "System Coignet;" and I do hereby declare that the following is a full and exact description thereof, which will enable any one skilled in the art to make and perform the same.

When we make a monolithic structure, or a block of artificial stone, by the system of agglomeration of sand, lime, and, in some cases, hydraulic cement, in the manner which I have described in my several patents, in pounding the artificial-stone paste, the pounder, presenting a smooth surface to the said paste, will, by its repeated action thereon, cause the same to be agglomerated into a stratum of a certain thickness, but presenting at its upper part a smooth surface, composed of an infinite number of small, smooth surfaces, the counterpart of the end of the pounder employed.

Now, as the setting of the lime and cement, the evaporation of the water, and the action of the air cause this smooth surface to harden promptly, if we spread upon this partly dry and set smooth surface a new quantity of artificial-stone paste to form a second stratum, although, being in immediate contact with the former, this second stratum will not weld itself to the former one in an absolute manner, and this want of absolute welding, this solution of continuity between the two strata, may, in some cases, permit them to part, and thereby materially weaken the resistance of the mass, by presenting partings, beads, cleavages, or seams throughout the mass of the béton. To obviate this difficulty, I have found that it was desirable, and now I do recommend in future, that before introducing, on a stratum of artificial stone just agglomerated, a new quantity of artificial-stone paste to be agglomerated thereon, the smoothness of the existing stratum has to be destroyed, the molecules have to be raised, a roughness created by the application to the surface aforesaid of a suitable tool, such as a rake, a comb, toothed wheel, or barrel, or any equivalent instrument which will produce the desired effect—which is to obtain a rough surface. I now employ for that purpose a fragment of saw-blade, which, on being dragged along on the smooth surface, will tear it, scratch it, and roughen it, so that the new stratum will not find itself brought in contact with a smooth surface.

I would always recommend, when it is intended to apply a new stratum, to resort to this mode of roughening the last stratum before it is set or dry, as it will be found that the work is much better. By this mode of operating, all the strata will be welded. They will strongly adhere one to the other, and there will be no fear of the masonry or block presenting the beads, seams, cleavages, or partings, of which I spoke above.

What I claim as my invention, and desire to secure by Letters Patent of the United States, is—

The herein-described mode of obtaining a masonry or block of artificial stone, of the character known as Coignet's agglomerate, without seams, beads, or partings, by means of the system of roughening of the surfaces of the strata, substantially as herein set forth.

In testimony whereof I have signed my name to this specification before two subscribing witnesses.

FRANÇOIS COIGNET.

Witnesses:
 EMILE BARRAULT,
 AMART, 17 *Boul. St. Martin, Paris.*